Figure 1:
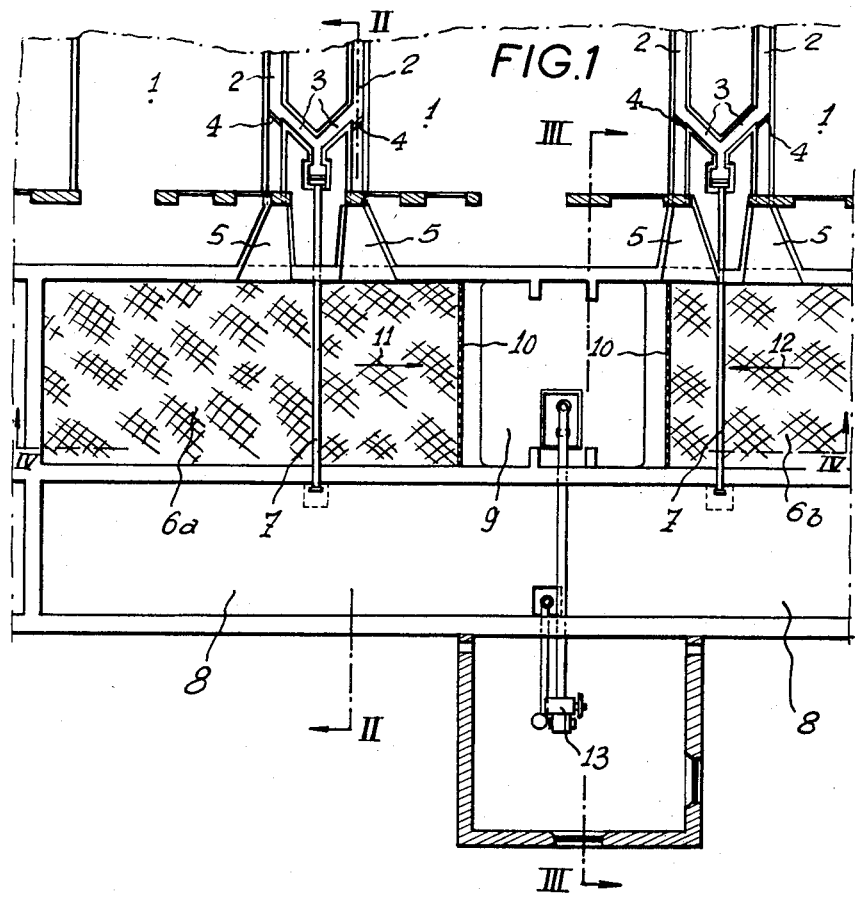

June 20, 1961  G. GILBERTON  2,989,379
SYSTEM FOR HANDLING AND STORING MANURE
Filed Jan. 29, 1959  3 Sheets-Sheet 1

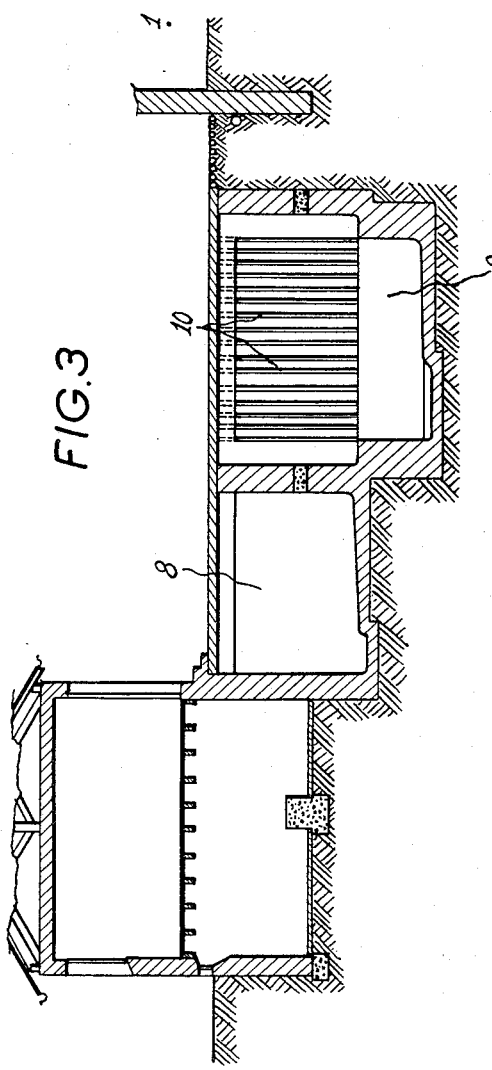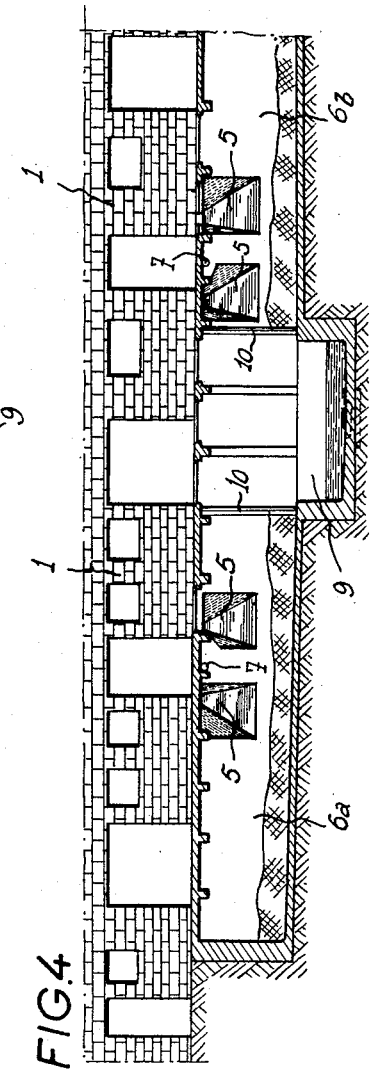

June 20, 1961  G. GILBERTON  2,989,379
SYSTEM FOR HANDLING AND STORING MANURE
Filed Jan. 29, 1959  3 Sheets-Sheet 3

2,989,379
SYSTEM FOR HANDLING AND STORING MANURE
Georges Gilberton, Les Gandins, par St-Germain de Salles, France
Filed Jan. 29, 1959, Ser. No. 790,022
Claims priority, application France Feb. 1, 1958
3 Claims. (Cl. 23—259.1)

This invention relates to means for handling and storing manure produced in cattle-sheds, stables, and similar premises housing animals, all referred to herein and in the claims by the generic term of cattle-sheds.

Various means have been developed for this purpose in the past, but none have been fully satisfactory. Mechanical means have been used involving scrapers passed through the manure collecting troughs extending in the shed, but the servicing of such mechanical means is tedious. Hydraulic means are more widely used and while such means are generally satisfactory in regard to the actual discharge of the manure from the cattle shed, such means have not heretofore enabled prolonged storage of the manure for subsequent use thereof as fertilizer, especially since fertilization is effected only during definite periods of the year excluding the winter season, whereas the production of manure is of course continuous during the winter period when the animals are housed in the shed. Further, known hydraulic manure handling means have not enabled convenient preparation of fertilizer mixture prior to spreading over the fields to be fertilized.

An object of the invention is to provide improved manure handling means of an hydraulic character. Another object is to improve the storage life of dung over prolonged periods of time such as the winter season when the dung is not required for fertilization. A further object is to provide convenient and efficient means for separately storing the solid constituents of manure (dung) and the liquid (urine) constituents thereof. A further object is to provide such a system wherein the preparation of a fertilizing mixture between the solid and liquid constituents of manure will be greatly facilitated.

The above and other objects and advantages of the invention are achieved, according to a broad aspect hereof, by the provision of a manure handling system comprising trough means in the cattle-shed adapted for collecting both the solid and liquid constituents of the manure produced in said shed, separate storage means for storing said solid and liquid constituents respectively, and means connecting said trough means with said separate storage means to convey said respective constituents thereto for separate retention therein.

In a system according to the invention the liquid manure constituents are discharged substantially continuously through the troughs to a liquid-manure pit or sump, while the discharge of the solid (dung) constituents together with washing water may be effected intermittently by way of the same troughs into a separate dung-pit or-heap, at which time the connection from the trough means to the liquid-manure sump may be plugged off.

According to an important aspect of the invention, adjacent to the dung-pit or -heap there is provided a central sump, which in some embodiments of the invention may be separate from the liquid-manure pit or sump and in other embodiments may be the same; and between the dung-pit or -heap and this central sump there is a perforate wall desirably provided in the form of a row of spaced stakes for allowing liquid to flow from the dung-pit or -heap into the sump while retaining the solids; some of the stakes in the row are removable whereupon a desired amount of dung will be dumped into the sump for the preparation of fertilizer mixture. A pump has an intake in the central sump and can serve to take up the material therefrom for direct delivery to the fields to be fertilized, and/or where the contents of the sump is mainly water, for cleaning the cattle shed.

Figure 2:
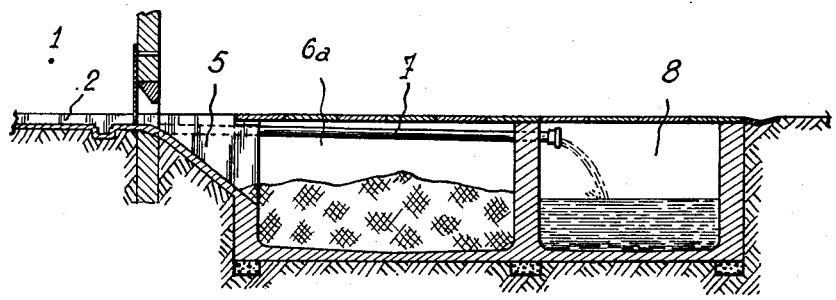
Figure 5:
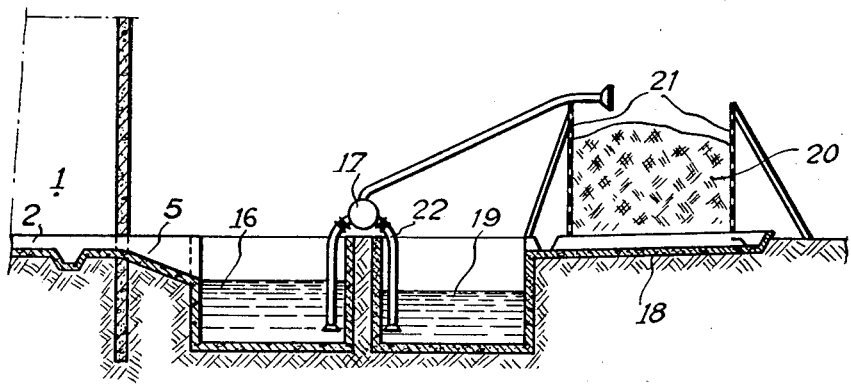
Figure 6:
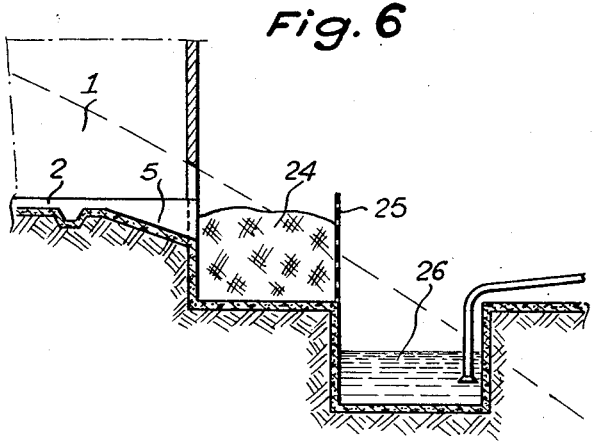

An exemplary embodiment of the invention as well as some modifications thereof are illustrated by way of example but not of limitation in the accompanying diagrammatic drawings, in which:

FIGURE 1 is a general view in plan of a manure handling system according to the invention;
FIGURE 2 is a section on line II–II of FIGURE 1;
FIGURE 3 is a section on line III–III of FIGURE 1;
FIGURE 4 is a section on line IV–IV of FIGURE 1; and
FIGURES 5 and 6 are vertical sectional views of modified systems according to the invention.

Referring to FIGURES 1 to 4, the reference 1 generally indicates a cow-shed or the like, and 2 designates gutters or troughs formed in the floor of the shed for the discharge of manure and dung. The troughs are only fragmentarily shown but it will be understood that they are arranged to extend all along the stalls, boxes or other locations in which the animals are normally positioned. The troughs are normally open so as to be capable of receiving both the dung and liquid manure as well as washing water. The troughs 2 are connected at their outer ends outside the stable with the flared passageways 5 (compare FIGURE 2) which discharge into rectangular dung-pits 6a and 6b. Further, the troughs 2 connect by way of branch troughs 3 with a cast iron pipe or the like 7 which extends across the dung-pit into a liquid-manure sump 8.

In order to prevent the liquid manure from flowing into the dung-pit 6a or 6b, an upward shelf or stop 4 is formed in the troughs 2 immediately beyond the connections with the branch troughs 3, whereby the urine and liquid manure is prevented from continuing along the main troughs but is forced to flow by way of the branch troughs 3 and pipe 7 into the liquid-manure sump.

It will be understood that the troughs such as 2 are open-topped so as to receive both the dung and urine as well as the washing water during shed-cleaning operations. During such cleaning operations, the branch troughs 3 are stopped as by means of plugs of straw and/or dung, so that the washing water mixed with manure will be directed into the dung-pit only. On completion of the cleaning operations the plugs are removed whereupon the liquid manure will normally flow in a continuous manner into the liquid manure sump 8.

As will be clearly apparent from FIGURE 1, in the exemplary installation illustrated there are provided two trough systems of the type described above, with the troughs 2 discharging into respectively related dung-pits 6a and 6b. The pipes 7 on the other hand are shown as discharging into a common liquid-manure or fluids sump 8 of relatively great length which extends along both dung pits 6a and 6b on the opposite side thereof from the cow-shed building.

A so-called central fluids sump 9 is provided according to the invention, being in the exemplary installation shown as positioned in between the two dung-pit sections 6a and 6b. The connecting means or separating walls between the central sump 9 and the respective dung-pit sections are provided in the form of perforate wall 10, e.g. formed by suitably spaced vertical stakes, with the perforations in said walls or the spacing between the stakes being so dimensioned as to prevent the dung from passing from the pits 6a and 6b into the central sump 9 while permitting the washing water carried into said pits during washing operations to flow into the central sump. To facilitate this, the side pits 6a and 6b are each formed with a sloping bottom towards the central sump 9 as indicated by the arrows 11 and 12. Such slope may suitably be on the order of 1%. A pump 13, shown positioned in a separate enclosure, has an intake positioned near the bottom of the sump 9 so as to permit recycling the water collected in the central sump 9 and reusing it in washing the shed.

Further, the central sump 9 according to the invention is usable in preparing a mixture of dung, liquid manure and water for spreading as fertilizer. When it is desired to do this, it is simply necessary to remove some of the stakes in the separating walls 10, or otherwise provide widened openings therein, so as to dump a requisite amount of solid manure into the central pool 9. Sumps 8 and 9 can be regarded as separate sections of a fluids sump constituted thereby.

It will be appreciated that with the arrangement described the dung can be stored in the dung-pits 6a and 6b for long periods of time. This is a particular advantage during wintertime where no fertilization is required.

If desired, drain pipes may be provided to facilitate the flow of washing water from the dung-pits into the central pool or sump 9. Further, means may be provided, such as a hose supplied from the pump 13, for pouring water or liquid manure such as in sump sections 8 and 9 onto the solid manure in the pits 6a and 6b, as for facilitating the passage thereof into the central pool 9 in view of a mixing operation.

In the modified system shown in FIG. 5, the separation between the solid and liquid manure is achieved in a different manner. In this embodiment the troughs 2 deliver by way of the passages or weirs 5 both the dung and liquid manure and water into one or more primary pits 16. A pump 17 takes up the mixture of solids and liquids from the pit 16 and discharges it to an elevated position over a platform 18 so as to form a dung-heap 20. The heap is enclosed by one or more perforate walls 21 similar to the perforate walls 10 in the first embodiment of the invention, so that the liquids pumped by the pump 17 over the slightly sloping platform 18 are allowed to flow by gravity into an adjacent sump 19 where such liquids collect. The pump 17 is shown as comprising a second intake pipe 22 dipping into the sump 19 for taking up the liquid therefrom as required, e.g. for cleaning and mixing purposes.

The modified embodiment just described has an advantage over that first described in that it requires less pit capacity for holding the manure, since the solid dung is simply heaped.

The further modification shown in FIG. 6 is especially designed for use on sloping ground, this circumstance being taken advantage of to save pumping power. As in the embodiment of FIG. 5, the combined dung and liquid manure and water are discharged from the troughs 2 through weirs 5 into a first pit 24. Adjacent to and lower down from this pit 24 is another pit or sump 26, and the wall 25 of the pit facing this sump 26 is made perforate, e.g. as a row of stakes. Thus the liquids flow through this wall and collect in the sump 26 so that only the solid manure or dung is retained in the upper pit 24 while the liquids collect in the lower pit or sump, and can be taken up therefrom by a pump for cleaning and the like.

In both the modified embodiments of FIGS. 5 and 6, fertilizing spreading mixture can conveniently be prepared in the sump 19 or 26 respectively, by simply removing some stakes from the separating walls, respectively 21 and 25, facing the sump, thereby allowing some dung to dump into it. It will further be noted that in both the modified embodiments of FIGS. 5 and 6 as in the first embodiment described, there is provided in accordance with the invention a separation between the solid manure or dung and the liquid manure, with the liquid being made to flow substantially continuously into a sump where it collects and whence it can be taken up for use as required. Various modifications other than those explicitly described and shown will occur to those familiar with the art and are to be deemed as forming part of the present invention.

What I claim is:
1. An installation for processing solid manure and fluids including fluid manure, urine and washing fluids from an animal station, said installation comprising a fluids sump and a solids sump, a trough adjacent said station for collecting said solid manure and fluids, said trough being at a level above said sumps and including first and second delivery means coupled respectively to said fluids and solids sumps, means in said trough for diverting at least a portion of the fluids therein into said first delivery means for delivery into said fluids sump, the remainder of the fluids and the solid manure passing via said second delivery means into said solids sump, a perforate wall between said sumps permitting fluid in said solids sump to drain into said fluids sump, and pump means for pumping fluid from said fluids sump into said solids sump for washing solids into said fluids sump whereby the fluids and solids can be mixed to constitute a fertilizer mixture.

2. An installation as claimed in claim 1 wherein said fluids sump includes first and second sections respectively coupled to said first delivery means and, via said perforate wall, to said solids sump.

3. An installation as claimed in claim 1 wherein said solids sump includes a bottom sloping towards the fluid sump.

References Cited in the file of this patent

UNITED STATES PATENTS

| | | |
|---|---|---|
| 404,348 | Endemann | May 28, 1889 |
| 1,329,727 | Smith | Feb. 3, 1920 |
| 1,617,014 | Derleth | Feb. 8, 1927 |
| 1,832,179 | Boggiano-Pico | Nov. 17, 1931 |
| 2,246,224 | Streander | June 17, 1941 |
| 2,297,195 | Behringer | Sept. 29, 1942 |